April 29, 1958
H. W. KRAMER
2,832,607
CORN PICKER TRANSPORTING TRAILER
Filed Sept. 9, 1955
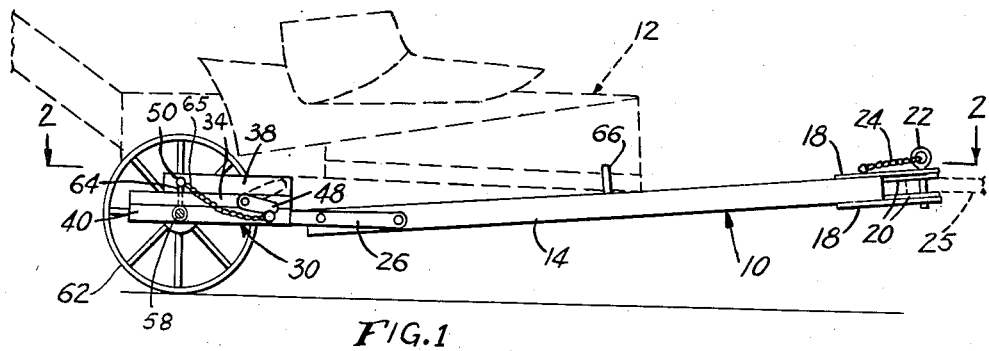
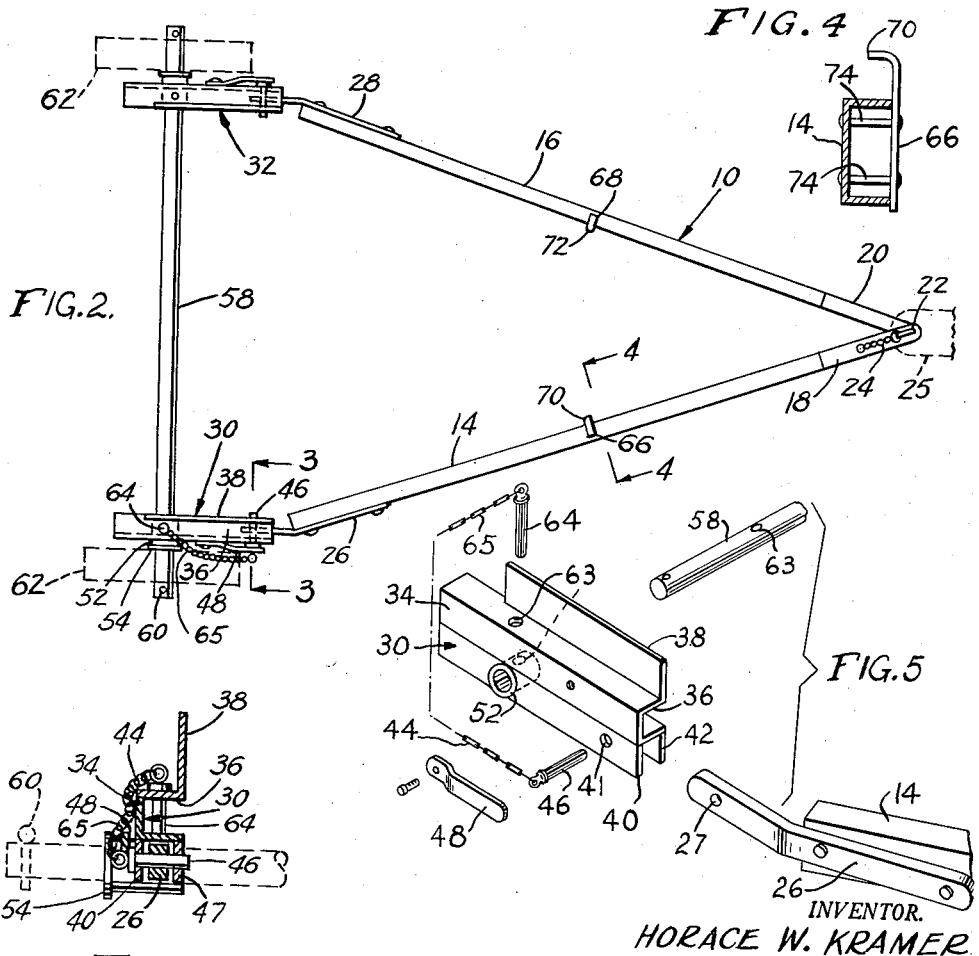
INVENTOR.
HORACE W. KRAMER
BY
McMorrow, Berman & Davidson
ATTORNEYS

United States Patent Office 2,832,607
Patented Apr. 29, 1958

2,832,607

CORN PICKER TRANSPORTING TRAILER

Horace W. Kramer, Eaton, Ohio

Application September 9, 1955, Serial No. 533,427

3 Claims. (Cl. 280—63)

This invention relates to an improved trailer, especially but not exclusively for transporting a corn picker, when detached from a tractor behind which the picker is usually drawn.

By way of background, a corn picker of present day construction is a comparatively heavy, unwieldy device, and excessive time and labor are involved each time the picker is to be attached to or detached from a tractor, and transported to and from the place of work. For example, when a corn picking operation has been completed and it is desired to use the tractor for other work, the picker must be moved by the tractor to its storage area and unhitched, and the tractor moved to another area.

The main object of the present invention is to provide a trailer especially designed for the purpose of transporting a picker out of contact with the ground, the trailer being especially designed for firmly and relatively immovably supporting the picker while being carried to and from its storage area.

Another object of the invention is to facilitate the disconnection of the picker from the trailer, as well as its attachment to the trailer.

Yet another object is to provide a corn picker trailer readily connectable at one end to the axle of the picker, and so designed as to elevate the front portion of the trailer responsive to upward swinging movement of the trailer about said axle into a position in which the front portion of the trailer can be hitched to a traction vehicle, such as a tractor.

Other objects are to provide a support device as described that is rugged, has a minimum number of parts, and is readily usable in association with conventional corn pickers and tractors, without requiring modification or redesign of either the picker or tractor.

Other objects will appear from the following description the claims appended thereto, and from the annexed drawing, in which like reference characters designate like parts throughout the several views, and wherein:

Figure 1 is a side elevational view of a trailer in accordance with the present invention, a supported corn picker being shown in dotted lines;

Figure 2 is a top plan view of Figure 1;

Figure 3 is an enlarged fragmentary transverse sectional view on line 3—3 of Figure 2; and Figure 4 is an enlarged transverse sectional view on line 4—4 of Figure 2.

Figure 5 is a partial exploded view of the assembly of Figure 3.

The illustrated trailer 10 is shown as carrying a conventional corn picker 12.

The trailer 10 comprises a pair of elongated straight forwardly converging tongue members 14, 16. Secured to the upper and lower side of the forward end of the tongue member 14 and projecting forwardly therefrom are bars 18, 18 while similar bars 20, 20 extend forwardly from the tongue member 16. The bars 20 are engaged between the bars 18 and are provided, at their overlapping front ends, with registering openings, receiving a drop pin 22 carried by a chain 24 connected to one of the bars 18. The drop pin 22 is arranged to extend through the draw bar 25 of a conventional tractor (not shown) inserted between the bars 20.

Secured to the laterally outward sides of and projecting rearwardly beyond the rear ends of the tongue members 14, 16, are connecting bars 26, 28 respectively, adapted to be detachably connected at their rear ends to the front ends of relatively short, straight axle support brackets 30, 32.

The brackets are identical though oppositely formed, and hence, the description of bracket 30 will suffice for bracket 32. Bracket 30 (Figure 3) includes a horizontal angle iron 34 having welded to its upper edge a laterally inwardly projecting flange 36 having along its inward edge an upwardly projecting vertical flange 38.

To the underside of the lower leg of the angle iron 34 are welded or otherwise fixedly secured horizontal parallel vertically spaced bars 40, 42. As shown in Figures 3 and 5, this construction defines an inwardly facing channel which is composed of the bars 40 and 42 and adjacent portion of the angle iron 34.

The front end of the connecting bar 26 is secured to the facing channel by means of a drop pin 46 which is removably engageable in registering openings 41 provided in the front end portions of bars 40, 42, which openings are aligned horizontally with an opening 27 provided in connecting bar 26.

When pin 46 is inserted, a locking bar 48, pivoted on the member, is swingable into position overlying the head of pin 46, to prevent accidental withdrawal of the pin.

In the rear end portion of flange 36 is an opening 63, disposed above an axle support sleeve 52 welded in recesses provided in the bars 40, 42. At its outer end, sleeve 52 has a circumferential collar 54.

Extending through the sleeve is an axle 58, and to prevent accidental withdrawal of said axle from a ground engaging wheel 62 rotatably mounted upon the end thereof, a pin 60 is provided on the end of the axle.

To secure the ends of the axle in the respective brackets 30, 32, there is provided a vertical drop pin 64, extendable through registering openings 63 formed in the sleeve 52 and in the axle 58. The pin 64 is connected by a chain 65 to the pin 46.

Intermediate their ends, the tongue members 14, 16 are provided on their inward sides with upwardly projecting elements 66, 68 respectively, terminating at their upper ends in laterally outwardly projecting, horizontal terminals 70, 72 adapted to hook over opposite sides of the corn picker 12, at the front ends of the picker. The hook elements are attached to the respective tongue members by spaced bolts 74, 74 (Figure 4).

In use of the device, the brackets 30, 32 are secured permanently to the frame of a picker at opposite sides thereof, at the rear end of said frame. The axle is extended through the brackets, and the wheels 62 are mounted upon the axle.

Assuming that the picker is to be transported to a storage area from a work area, it is merely necessary to unhitch the picker from the tractor. Then, with the hitch pin 22 removed, the tongue members 14, 16 are swung laterally away from each other, and the connecting bars 26, 28 are connected by means of pins 46 to the axle brackets.

The tongue members 14, 16 are then swung inwardly so as to engage elements 68, 68 with the sides of the picker frame. In this position of tongue members 14, 16 they underlie the front ends of the picker. The drop pin 22 is then dropped through the forwardly converging ends of the tongue members and through the tractor bar 25, When the tongue members have been swung upwardly to their Figure 1 positions, the picker is rollably supported completely out of contact with the ground surface, and can be drawn by the tractor to its storage area and left there upon the tongue members awaiting its next use.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a trailer for transporting a corn picker, a pair of laterally spaced brackets having front and rear ends, an axle extending between and extending through said brackets, said axle having ends projecting laterally outwardly beyond the brackets, ground engaging wheels journalled on said axle ends, vertical drop pins traversing the brackets and said axle and securing said brackets in laterally spaced relation on said axle, a pair of horizontal forwardly converging tongue members having front and rear ends, said tongue members extending forwardly from said brackets, a connecting bar projecting from each of the rear ends of said tongue members, said brackets each having vertically extending transversely spaced elements receiving therebetween the end portion of the adjacent connecting bar, a horizontal drop pin traversing the laterally spaced vertically extending elements and the end portion of the adjacent connecting bar and securing the tongue members to the brackets, the front ends of the tongue members being separably engaged with each other, and a vertical hitch pin traversing the front ends of the tongue members and securing the front ends of the tongue members together.

2. In a trailer for transporting a corn picker, a pair of laterally spaced brackets having front and rear ends, an axle extending between and extending through said brackets, said axle having ends projecting laterally outwardly beyond the brackets, ground engaging wheels journalled on said axle ends, vertical drop pins traversing the brackets and said axle and securing said brackets in laterally spaced relation on said axle, a pair of horizontal forwardly converging tongue members having front and rear ends, said tongue members extending forwardly from said brackets, a connecting bar projecting from each of the rear ends of said tongue members, said brackets each having vertically extending transversely spaced elements receiving therebetween the end portion of the adjacent bar, a horizontal drop pin traversing the laterally spaced vertically extending elements and the end portion of the adjacent connecting bar and securing the tongue members to the brackets, the front ends of the bolsters being separably engaged with each other, and a vertical hitch pin traversing the front ends of the tongue members together, and corn picker engaging members on said tongue members at points intermediate the ends of the tongue members and projecting thereabove for holding a corn picker in position upon the tongue members.

3. In a trailer for transporting a corn picker, a pair of laterally spaced brackets having front and rear ends, an axle extending between and extending through said brackets, said axle having ends projecting laterally outwardly beyond the brackets, ground engaging wheels journalled on said axle ends, vertical drop pins traversing the brackets and said axle and securing said brackets in laterally spaced relation on said axle, a pair of horizontal forwardly converging tongue members having front and rear ends, said tongue members extending forwardly from said brackets, a connecting bar projecting from each of the rear ends of said tongue members, said brackets each having vertically extending transversely spaced elements receiving therebetween the end portion of the adjacent connecting bar, a horizontal drop pin traversing the laterally spaced vertically extending elements and the end portion of the adjacent connecting bar and securing the tongue members to the brackets, the front ends of the tongue members being separably engaged with each other, and a vertical hitch pin traversing the front ends of the tongue members and securing the front ends of the tongue members together, and corn picker engaging members on said tongue members at points intermediate the ends of the tongue members and projecting thereabove for holding a corn picker in position upon the tongue members, said hitch pin being removable, and the spacing between the vertically extending transversely spaced elements of said bracket being sufficient to permit the tongue members to be swung laterally toward and away from each other to engage and disengage said picker engaging elements with sides of the picker.

References Cited in the file of this patent

UNITED STATES PATENTS

| | | |
|---|---|---|
| 283,290 | Simpson | Aug. 14, 1883 |
| 657,035 | Skorkowsky | Aug. 28, 1900 |
| 2,479,099 | Cerny | Aug. 16, 1949 |
| 2,500,686 | Jontz | Mar. 14, 1950 |
| 2,509,824 | Johnson | May 30, 1950 |
| 2,601,992 | Dillon | July 1, 1952 |
| 2,620,201 | Brady | Dec. 2, 1952 |

FOREIGN PATENTS

| | | |
|---|---|---|
| 715,481 | Germany | Dec. 22, 1941 |